Feb. 16, 1932.   M. S. REYNOLDS   1,845,189
POTATO DIGGER
Filed Oct. 27, 1930   4 Sheets-Sheet 1
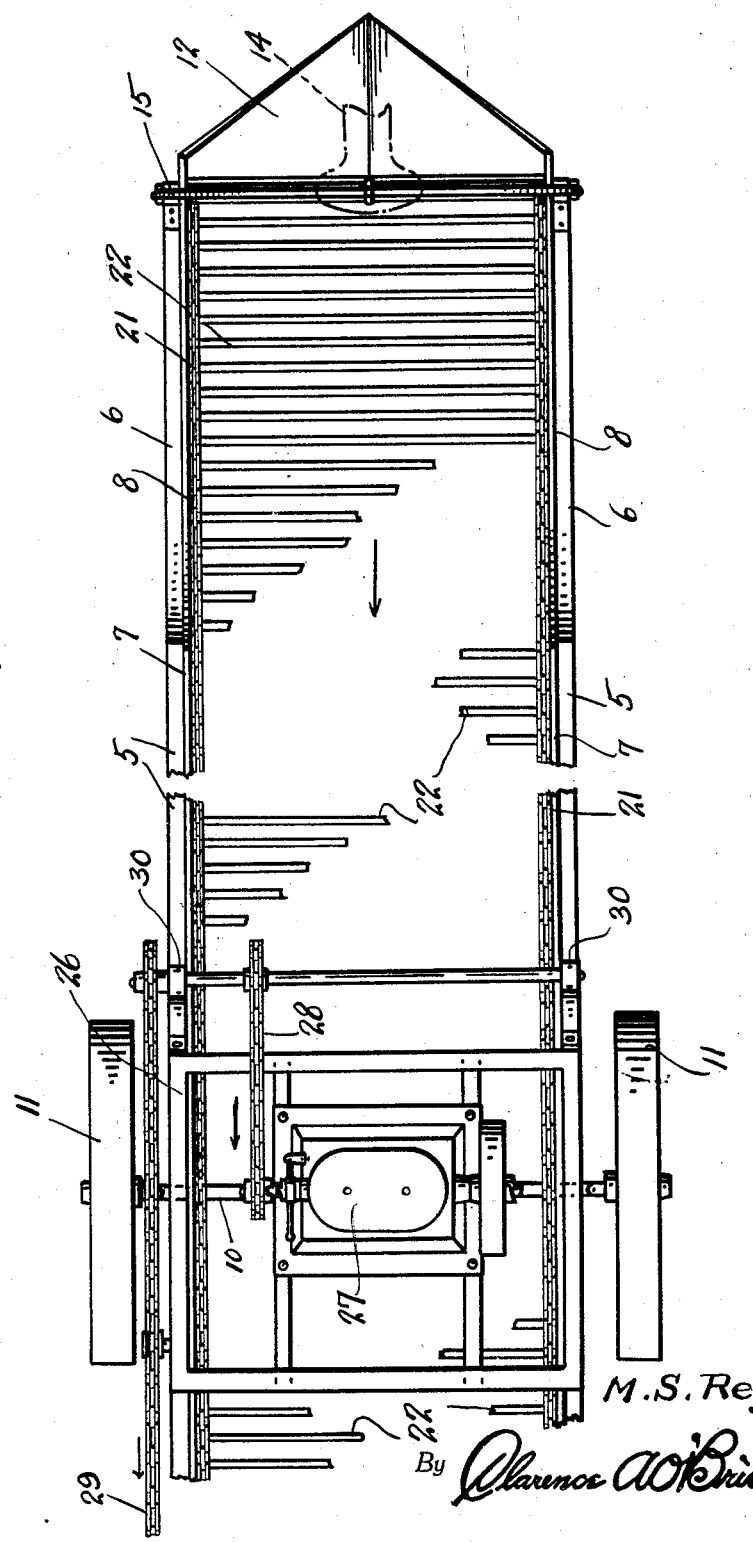
Inventor
M.S. Reynolds
By Clarence A. O'Brien
Attorney

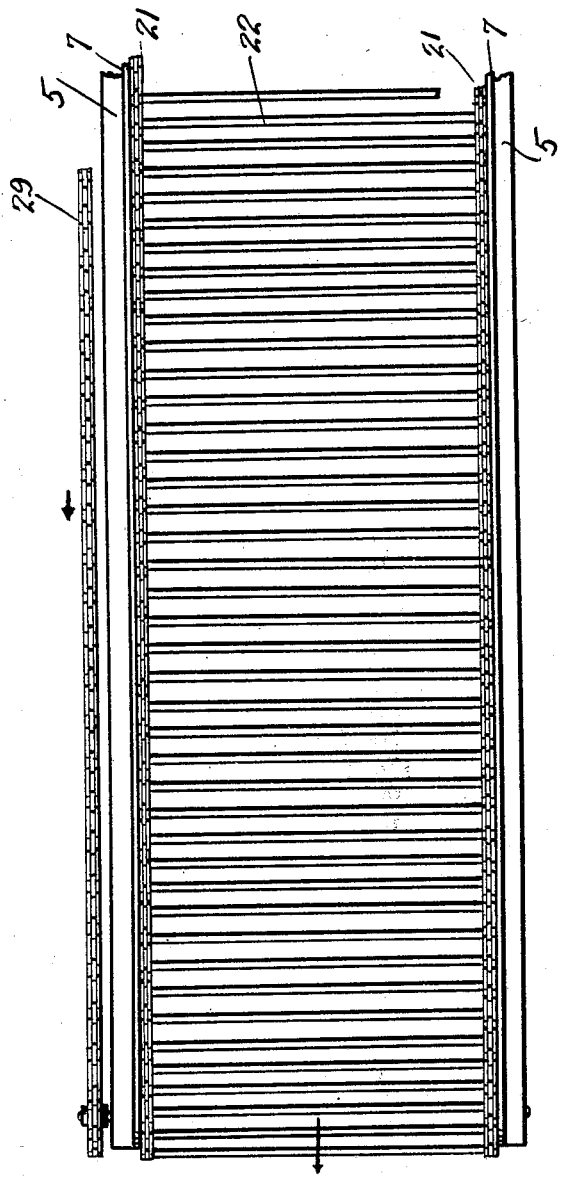

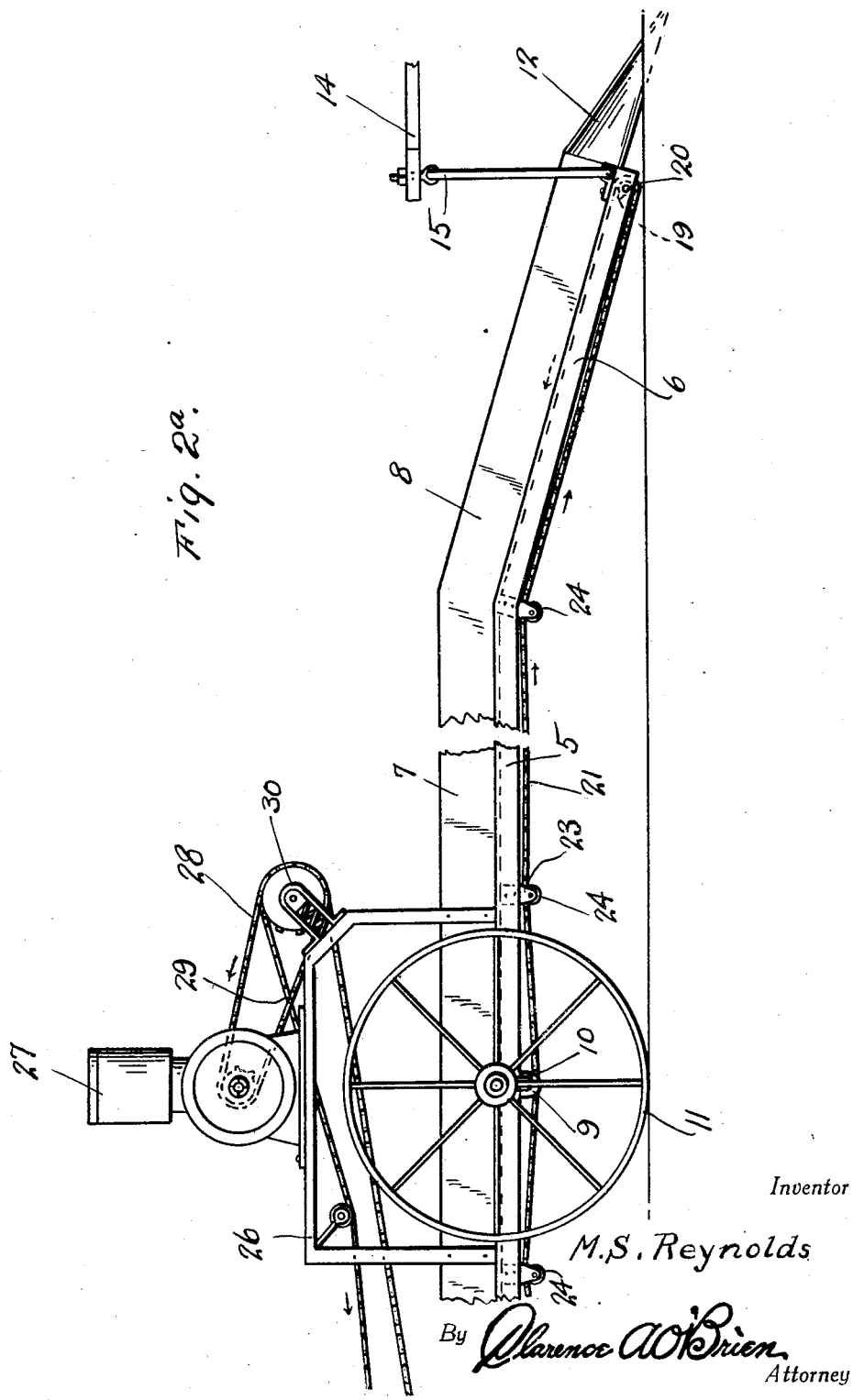

Feb. 16, 1932.  M. S. REYNOLDS  1,845,189
POTATO DIGGER
Filed Oct. 27, 1930  4 Sheets-Sheet 4
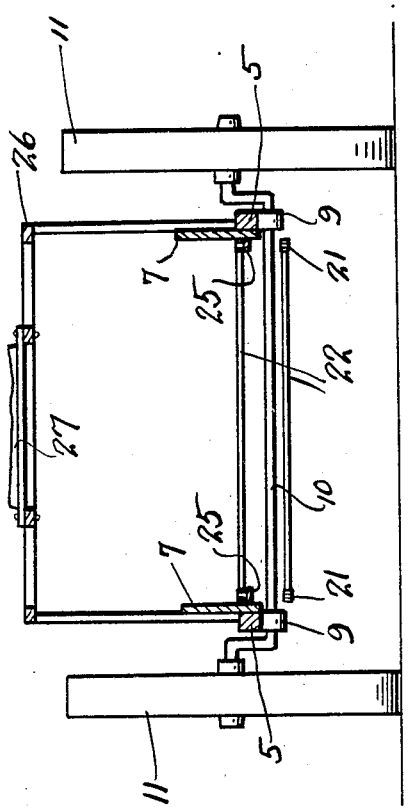
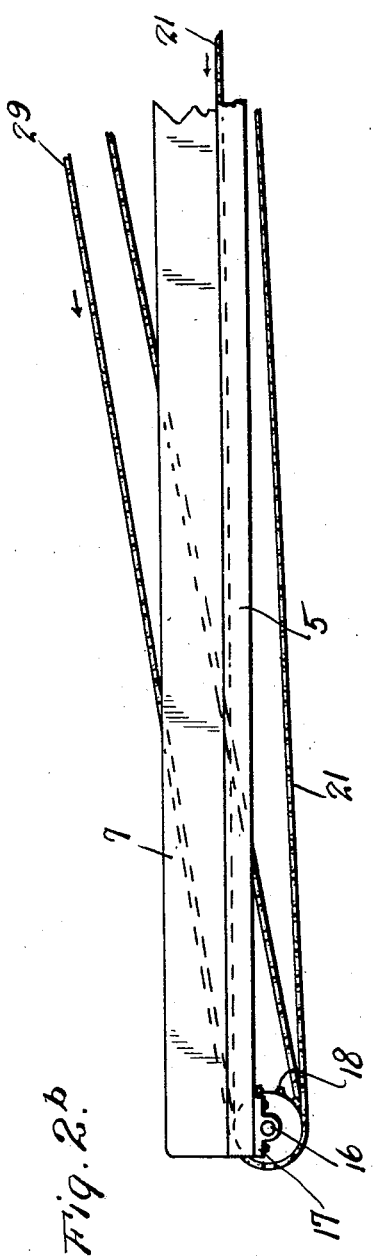
Inventor
M.S. Reynolds
By Clarence A. O'Brien
Attorney Patented Feb. 16, 1932

1,845,189

UNITED STATES PATENT OFFICE

MARSHALL S. REYNOLDS, OF FORT FAIRFIELD, MAINE

POTATO DIGGER

Application filed October 27, 1930. Serial No. 491,567.

The present invention relates to a machine for digging potatoes from the ground and depositing them in the rear and has for its prime object to provide a structure which is comparatively low in its arrangement of parts, to prevent bruising of the potatoes.

Another very important object of the invention resides in the provision of a potato digger of this nature which is comparatively simple in construction, strong and durable, thoroughly efficient and reliable in use and operation, compact and convenient in its arrangement of parts, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figures 1a and 1b form a top plan view of the machine embodying the features of this invention, Figures 2a and 2b form a side elevational view thereof, and Figure 3 is a vertical transverse section through the machine.

Referring to the drawings in detail it will be seen that numerals 5 denote a pair of elongated side bars disposed in spaced parallel coextensive relationship to each other and merging at their forward ends in downwardly inclined extensions 6. Side boards 7 rise from the bars 5 and merge into downwardly and forwardly inclined extensions 8 rising from the extensions 6. The intermediate portions of the side bars 5 are mounted by suitable means 9 on a drop axle 10 on the ends of which are journalled wheels 11 so that the apparatus is located in close proximity to the ground thereby preventing the bruising of the potatoes as they are dropped on the ground or in any receptacle as will become apparent as the description proceeds.

Mounted on the front extremities of the extensions 6 and the front ends of the extensions 8 is a digging spade 12. Numeral 14 denotes the draw bar attached to the front end of the bar extension 6 by suitable yoke 15 or the like so that the apparatus may be pulled along by a tractor or other suitable draft means. The yoke is rigidly connected to the draw bar and to the extension 6, so that it always remains in an upright position.

A shaft 16 is journalled in bearings 17 under the rear ends of the bars 5 and has sprockets 18 fixed thereto. Sprockets 19 are mounted on a shaft 20 between the front ends of the extensions 6. Endless chains 21 are journalled over the sprockets 18 and 19. A plurality of spaced parallel slats 22 are mounted between the chains 21. A plurality of brackets 23 are arranged at spaced intervals on the bars 5 and their extensions 6 and have idlers 24 thereon under the lower runs of the endless chains 21.

The upper runs of these chains 21 ride on flanges or shoulders 25 projecting inwardly from the side boards 7 and their extensions 8. A super frame structure 26 rises from the side bars 5 adjacent the wheels 11 and an engine 27 is mounted thereon having a chain and sprocket connection 28 with a chain and sprocket mechanism 29 operatively connected with the shaft 16.

A chain tightening mechanism 30 is mounted on the frame 26 to provide proper tension for the chains of the mechanisms 28 and 29. From the above detailed description it will be seen that as this apparatus is pulled along, the digging spade 12 digs into the ground causing the potatoes to be delivered up on to the lower portion of the endless conveyor formed by the slats and endless chains so that the potatoes are moved upwardly and rearwardly to be deposited on the ground or in suitable receptacles. Particular attention is directed to the relative low position which is afforded the entire machine because of the drop axle structure. It will be seen that the machine is exceeding simple in its construction, may be manufactured at a relatively low cost, is strong and durable, and well adapted to withstand the use to which it is adapted to be put in actual operating condition.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A machine of the class described comprising a pair of elongated spaced parallel coextensive side bars merging at their forward ends into downwardly and forwardly inclined extensions, an endless conveyor mounted between the side bars and their extensions, a digging element at the lower ends of the extensions, and a wheeled truck for supporting the side bars, said wheeled truck including a drop axle on the lower portion of which are supported the side bars, a superframe rising from intermediate portions of the side bars and having an engine mounted thereon, and means operatively connecting the engine with the endless conveyor.

2. A machine of the class described comprising a pair of elongated spaced parallel coextensive side bars merging at their forward ends into downwardly and forwardly inclined extensions, an endless conveyor mounted between the side bars and their extensions, a digging element at the lower ends of the extensions, and a wheeled truck for supporting the side bars, said wheeled truck including a drop axle on the lower portion of which are supported the side bars, a superframe rising from intermediate portions of the side bars and having an engine mounted thereon, and means operatively connecting the engine with the endless conveyor, said endless conveyor being formed from a pair of endless chains trained over sprocket and axle structures and having a plurality of slats therebetween.

3. A machine of the class described comprising a pair of elongated spaced parallel coextensive side bars merging at their forward ends into downwardly and forwardly inclined extensions, an endless conveyor mounted between the side bars and their extensions, a digging element at the lower ends of the extensions, and a wheeled truck for supporting the side bars, said wheeled truck including a drop axle on the lower portion of which are supported the side bars, a superframe rising from intermediate portions of the side bars and having an engine mounted thereon, and means operatively connecting the engine with the endless conveyor, said endless conveyor being formed from a pair of endless chains trained over sprocket and axle structures and having a plurality of slats therebetween, side boards rising from the side bars and their extensions and formed with inwardly directed flanges on which the upper runs of the chains rise.

4. A machine of the class described comprising a pair of elongated spaced parallel coextensive side bars merging at their forward ends into downwardly and forwardly inclined extensions, an endless conveyor mounted between the side bars and their extensions, a digging element at the lower ends of the extensions, and a wheeled truck for supporting the side bars, said wheeled truck including a drop axle on the lower portion of which are supported the side bars, a superframe rising from intermediate portions of the side bars and having an engine mounted thereon, and means operatively connecting the engine with the endless conveyor, said endless conveyor being formed from a pair of endless chains trained over sprocket and axle structure and having a plurality of slats therebetween, side boards rising from the side bars and their extensions and formed with inwardly directed flanges on which the upper runs of the chains rise, brackets depending from the side bars and their extensions and having rollers mounted thereon under the lower runs of the chains.

In testimony whereof I affix my signature.

MARSHALL S. REYNOLDS.